(12) United States Patent
Raffy

(10) Patent No.: US 8,557,012 B2
(45) Date of Patent: Oct. 15, 2013

(54) MOLTEN OXIDE GRAINS INCLUDING AL AND TI, AND CERAMIC MATERIALS COMPRISING SAID GRAINS

(75) Inventor: Stephane Raffy, Cavaillon (FR)

(73) Assignee: Saint-Gobain Centre de Recherches Et d'Etudes Europeen, Courbevoie (FR)

( * ) Notice: Subject to any disclaimer, the term of this patent is extended or adjusted under 35 U.S.C. 154(b) by 0 days.

(21) Appl. No.: 13/386,755

(22) PCT Filed: Jul. 27, 2010

(86) PCT No.: PCT/FR2010/051586
§ 371 (c)(1),
(2), (4) Date: Jan. 24, 2012

(87) PCT Pub. No.: WO2011/015766
PCT Pub. Date: Feb. 10, 2011

(65) Prior Publication Data
US 2012/0124953 A1     May 24, 2012

(30) Foreign Application Priority Data

Jul. 28, 2009   (FR) ..................................... 09 55282

(51) Int. Cl.
| | |
|---|---|
| B01D 39/14 | (2006.01) |
| B01D 39/06 | (2006.01) |
| B01D 24/00 | (2006.01) |
| B01D 50/00 | (2006.01) |

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| | | | |
|---|---|---|---|
| 4,042,403 A * | 8/1977 | Reade ................................ 501/7 |
| 4,306,909 A | 12/1981 | Oda et al. | |
| 4,483,944 A * | 11/1984 | Day et al. ........................ 502/439 |
| 4,528,275 A * | 7/1985 | Hodge ................................ 501/9 |
| 4,598,054 A * | 7/1986 | Mochida et al. ............... 501/112 |
| 4,767,731 A | 8/1988 | Asami et al. | |
| 6,375,910 B1 * | 4/2002 | Deeba et al. ................ 423/239.1 |
| 2006/0021308 A1 * | 2/2006 | Merkel ............................ 55/523 |
| 2007/0006561 A1 * | 1/2007 | Brady et al. ..................... 55/523 |
| 2008/0283465 A1 * | 11/2008 | Liu et al. ........................ 210/496 |
| 2010/0237007 A1 * | 9/2010 | Merkel et al. ............... 210/510.1 |
| 2010/0257829 A1 * | 10/2010 | Yamaguchi ..................... 55/495 |
| 2010/0310819 A1 * | 12/2010 | Suwabe et al. ................. 428/116 |
| 2011/0105318 A1 | 5/2011 | Raffy | |

FOREIGN PATENT DOCUMENTS

| | | |
|---|---|---|
| DE | 37 07 396 | 9/1988 |
| EP | 0 036 462 | 9/1981 |
| EP | 0 210 813 | 2/1987 |
| FR | 2 609 021 | 7/1988 |
| WO | WO2008005249 | * 1/2008 |

OTHER PUBLICATIONS

U.S. Appl. No. 13/379,910, filed Dec. 21, 2011, Raffy.
International Search Report Issued Oct. 26, 2010 in PCT/FR10/51586 Filed Jul. 27, 2010.

* cited by examiner

*Primary Examiner* — Amber Orlando
(74) *Attorney, Agent, or Firm* — Oblon, Spivak, McClelland, Maier & Neustadt, L.L.P.

(57) ABSTRACT

Fused particles having the following chemical composition, as a percentage by weight on the basis of the oxides:
- more than 15% but less than 55% of $Al_2O_3$;
- more than 25% but less than 60% of $TiO_2$;
- less than 20%, in total, of at least one oxide of an element $M_1$, chosen from MgO and CoO;
- more than 0.7% but less than 20%, in total, of at least one oxide of an element $M_2$, chosen from the group formed by $Fe_2O_3$, $Cr_2O_3$, $MnO_2$, $La_2O_3$, $Y_2O_3$ and $Ga_2O_3$;
- less than 20%, in total, of at least one oxide of an element $M_3$, chosen from the group formed by $ZrO_2$, $Ce_2O_3$ and $HfO_2$; and
- less than 30% of $SiO_2$.

Ceramic product or material obtained by sintering said particles.

20 Claims, No Drawings

MOLTEN OXIDE GRAINS INCLUDING AL AND TI, AND CERAMIC MATERIALS COMPRISING SAID GRAINS

CROSS-REFERENCE TO RELATED APPLICATIONS

This application is a National Stage of PCT/FR10/051,586 filed Jul. 27, 2010 and claims the benefit of FR 0955282 filed Jul. 28, 2009.

The invention relates to particles for ceramic applications, consisting predominantly of oxides comprising the elements Al, Ti. The invention also relates to a process for manufacturing such particles and to ceramic materials and/or products formed from said particles or comprising them, in particular, but not solely, to filter structures or catalyst supports, especially used in an exhaust line of a diesel internal combustion engine.

In the rest of the description, for convenience and in accordance with customary practice in the ceramics field, said oxides comprising the above elements will be described with reference to the corresponding simple oxides, for example $Al_2O_3$ or $TiO_2$. In particular, in the following description, unless otherwise mentioned the proportions of the various elements constituting the oxides according to the invention are given with reference to the weight of the corresponding simple oxides, relative to the percentage by weight of all of the oxides present in said particles.

In the rest of the description, the application of the particles according to the invention and their advantages in the specific field of filters or catalyst supports for eliminating pollutants comprised in the exhaust gas coming from a gasoline or diesel internal combustion engine will be more particularly described. However, it is obvious that such particles, by means of the advantages that they provide, can be used advantageously in many other applications in the ceramics field, especially in any field for which good thermal stability and/or a low thermal expansion coefficient (TEC) are required. The following fields may in particular be mentioned, without being restricted thereto: manufacture of refractory parts used in contact with aluminum or metals in the molten state; slide gate plates; metal filters; or manufacture of saggers for sintering furnaces.

In the particular case of exhaust gas pollution control structures, these are generally of the honeycomb type.

As is known, a particulate filter during its use is subjected to a succession of filtration (soot accumulation) and regeneration (soot elimination) phases. During the filtration phases, the soot particles emitted by the engine are retained and deposited inside the filter. During the regeneration phases, the soot particles are burnt off inside the filter, so as to restore the filtering properties thereof. It is therefore understood that the mechanical resistance properties, both at low temperature and high temperature, of the constituent material of the filter are of paramount importance for such an application. Likewise, the material must have a sufficiently stable structure so as to withstand, especially over the entire lifetime of the vehicle fitted therewith, temperatures which may rise locally up to values substantially above 1000° C., especially if certain regeneration phases are poorly controlled.

At the present time, the filters are mainly made of a porous ceramic, usually silicon carbide or cordierite. Such silicon carbide catalytic filters are for example described in the patent applications EP 816 065, EP 1 142 619, EP 1 455 923 or WO 2004/090294 and WO 2004/065088. Such filters make it possible to obtain chemically inert filtering structures which exhibit excellent thermal conductivity and have porosity characteristics, in particular the average size and the size distribution of the pores, which are ideal for their application in filtering the soot particles output from an internal combustion engine.

However, this material still has a number of intrinsic drawbacks. A first drawback is the somewhat high thermal expansion coefficient of SiC, greater than $4 \cdot 10^{-6}$ $K^{-1}$, which prevents the manufacture of large monolithic filters and usually requires the filter to be segmented into several honeycomb elements bonded together with a cement, as described in patent application EP 1 455 923. A second drawback, of an economic nature, is the extremely high firing temperature, typically above 2100° C., for sintering so as to ensure that the honeycomb structures have sufficient thermomechanical resistance, especially during successive regeneration phases of the filter. Such temperatures require the installation of special equipment that substantially increases the cost of the filter finally obtained.

On the other hand, although cordierite filters are known and have been used for a long time, because of their low cost, it is now known that problems may arise in such structures, especially during poorly controlled regeneration cycles, over the course of which the filter may be locally subjected to temperatures above the melting point of cordierite. The consequences of these hotspots may range from a partial loss of efficiency of the filter to its complete destruction in the severest cases. Furthermore, cordierite does not have sufficient chemical inertness at the temperatures reached during successive regeneration cycles and consequently is liable to react with and be corroded by the species coming from residues of lubricant, fuel or other oils, which have accumulated in the structure during filtration phases, which phenomenon may also be a cause of rapid deterioration in the properties of the structure.

For example, such drawbacks are described in patent application WO 2004/011124 which provides, to remedy said drawbacks, a filter based on aluminum titanate (60 to 90 wt %) reinforced with mullite (10 to 40 wt %), the durability of which is improved.

According to another construction, patent application EP 1 559 696 proposes the use of powders for manufacturing honeycomb filters obtained by reactive sintering of aluminum, titanium and magnesium oxides between 1000 and 1700° C. The material obtained after sintering is in the form of a mixture of two phases: a major phase of the pseudo-brookite ($Al_2TiO_5$) alumina titanate structural type comprising titanium, aluminum and magnesium and a feldspar minor phase of the $Na_yK_{1-y}AlSi_3O_8$ type.

However, experiments carried out by the applicant have shown that it is difficult at the present time to guarantee the performance of a structure based on materials of the alumina titanate type, in particular to achieve thermal stability and corrosion resistance values of said materials that are suitable for example to make them able to be used directly in a high-temperature application of the particulate filter type.

Especially in the particular application of filtering particles by a material from a group of oxides, the corrosion resistance must be controlled so as to avoid modifying the porosity of the filter. More precisely, a high propensity to corrosion of the material used as a constituent of the filter results in a reaction liable to close up the porosity and considerably reduce the filtration capability and, in the severest cases, may be the cause of leakage because of a filtering wall being punctured.

According to a first aspect, the present invention relates to novel particles comprising or formed by an oxide material of the aluminum titanate type having properties such as those described above, which are substantially improved, especially so as to make it more advantageous to use them in many fields of application of ceramics and in particular for the manufacture of a filter and/or catalytic structure, typically a honeycomb structure.

More precisely, according to the first aspect, the present invention relates to fused particles having the following chemical composition, as a percentage by weight on the basis of the oxides:

more than 15% but less than 55% of $Al_2O_3$;
more than 25% but less than 60% of $TiO_2$;
less than 20%, in total, of at least one oxide of an element $M_1$, chosen from MgO and CoO;
more than 0.7% but less than 20%, in total, of at least one oxide of an element $M_2$, chosen from the group formed by $Fe_2O_3$, $Cr_2O_3$, $MnO_2$, $La_2O_3$, $Y_2O_3$ and $Ga_2O_3$;
less than 20%, in total, of at least one oxide of an element $M_3$, chosen from the group formed by $ZrO_2$, $Ce_2O_3$ and $HfO_2$; and
less than 30% of $SiO_2$.

Preferably, said fused particles according to the invention furthermore correspond to a composition, in mol % on the basis of all of the oxides present in said particles, such that: $a'-t+2m_1+m_2$ is between −15 and 15, in which:

a is the molar percentage of $Al_2O_3$;
s is the molar percentage of $SiO_2$;
$a'=a-0.37$ s,
t is the molar percentage of $TiO_2$;
$m_1$ is the total molar percentage of the oxide(s) of $M_1$; and
$m_2$ is the total molar percentage of the oxide(s) of $M_2$.

Preferably, in the above formulation, $a'-t+2m_1+m_2$ is between −10 and 10, more preferably $a'-t+2m_1+m_2$ is between −8 and 8 and very preferably $a'-t+2m_1+m_2$ is between −6 and 6.

According to the invention, the particles according to the invention may thus comprise, apart from the elements Al and Ti, at least one element $M_1$ which may be chosen from Mg and Co, at least one element $M_2$ which may be chosen from Fe, Cr, Mn, La, Y and Ga, and at least one element $M_3$ which may be chosen from Zr, Ce and Hf.

Preferably, $Al_2O_3$ represents more than 20% of the chemical composition, the percentages being given by weight on the basis of the oxides. For example, especially for an application of the porous structure type, $Al_2O_3$ may represent more than 25% and more preferably more than 35% of the chemical composition. Preferably, $Al_2O_3$ represents less than 52% or even less than 51% of the chemical composition, the percentages being given by weight on the basis of the oxides.

Preferably, $TiO_2$ represents more than 26% of the chemical composition. Preferably, $TiO_2$ represents less than 55%, or less than 50% or even less than 45% of the chemical composition, the percentages being given by weight on the basis of the oxides.

Preferably, the one or more oxides of $M_1$, if present, represent more than 0.7%, or more than 1%, or more than 1.5% and very preferably more than 2% of the chemical composition. Preferably, the one or more oxides of $M_1$ represent less than 10% and very preferably less than 6% of the chemical composition, the percentages being given by weight and on the basis of the oxides.

Preferably, $M_1$ is just Mg.

Preferably, the one or more oxides of $M_2$ represent more than 1%, or more than 1.5% and very preferably more than 2% of the chemical composition. Preferably, the one or more oxides of $M_2$ represent in total less than 10% and very preferably less than 6% of the chemical composition, the percentages being given by weight and on the basis of the oxides.

Preferably, $M_2$ is just Fe. As a variant likewise preferred, the element $M_2$ may be formed by a combination of iron and lanthanum.

In such an embodiment, $Fe_2O_3$ (or the sum of the contents by weight of the $Fe_2O_3$ and $La_2O_3$ species) represents more than 0.7%, or more than 1% and very preferably more than 1.5% of the chemical composition. Preferably, $Fe_2O_3$ (or the $Fe_2O_3+La_2O_3$ sum by weight) represents less than 10% and very preferably less than 9% or even less than 8% of the chemical composition, the percentages being given by weight on the basis of the oxides.

In one embodiment, the composition comprises iron and magnesium and optionally lanthanum. The corresponding oxides $Fe_2O_3$ and MgO and optionally $La_2O_3$ then represent, by weight and in total, more than 1%, or more than 1.5% and very preferably more than 2% of the chemical composition of the particles. Preferably, $Fe_2O_3$ and MgO and optionally $La_2O_3$ together represent less than 10% and very preferably less than 8%, or even less than 6% of the chemical composition, the percentages being given by weight on the basis of the oxides.

Preferably, the one or more oxides of $M_3$, if present, represent in total more than 0.7%, or even more than 0.8% and very preferably more than 1% of the chemical composition, the percentages being given by weight and on the basis of the oxides. Preferably, the one or more oxides of $M_3$ represent in total less than 10% and very preferably less than 8% of the chemical composition.

Preferably, $M_3$ is just Zr.

The particles according to the invention may furthermore comprise other minor elements. In particular, the particles may comprise silicon in an amount for example of between 0.1 and 20% by weight on the basis of the corresponding oxide $SiO_2$. For example, $SiO_2$ represents more than 0.1%, especially more than 1% or even more than 2% of the chemical composition. For example, $SiO_2$ represents less than 18%, than less than 15%, or less than 12% or even less than 10% of the chemical composition, the percentages being given by weight on the basis of the oxides.

The particles may furthermore comprise other elements such as alkali metals or alkaline-earth metals of the Ca, Sr, Na, K and Ba type, the total summed amount of said elements present being preferably less than 10 wt %, for example less than 5 wt %, or less than 4 wt % or less than 3 wt %, on the basis of the corresponding oxides CaO, SrO, $Na_2O$, $K_2O$ and BaO relative to the percentage by weight of all of the oxides present in said particles. The percentage by weight of each minor element, on the basis of the weight of the corresponding oxide, is for example less than 4%, or less than 3% or even less than 1%.

In order for the present description not to be unnecessarily burdened, all the possible combinations according to the invention among the various preferred embodiments of the compositions of the particles according to the invention, such as those that have been described above, are not reported here. However, all possible combinations of the ranges and initial and/or preferred values described above are of course envisaged at the time of filing of the present application and must be considered as described by the applicant in the context of the present description (especially two, three or more combinations).

The fused particles according to the invention may comprise mainly or be formed by an oxide phase in solid solution of the aluminum titanate type comprising titanium, aluminum and at least one element chosen from $M_1$, $M_2$ and $M_3$.

Preferably, the fused particles according to the invention may mainly comprise or be formed by an oxide phase in solid solution comprising titanium, aluminum, iron and optionally magnesium and/or zirconium.

The term "mainly" is understood in the context of the present description to mean that said oxide phase represents at least 60% and preferably at least 70% or even at least 75% of the total weight of the particles.

Very particularly, particles according to the invention may advantageously comprise a main oxide phase of the aluminum titanate type having the following composition, in wt % on the basis of the oxides:
- more than 45% but less than 55% of $Al_2O_3$;
- more than 30% but less than 50% of $TiO_2$;
- more than 1% but less than 10% of $Fe_2O_3$;
- less than 5% of $SiO_2$; and
- less than 5% of $ZrO_2$.

According to possible embodiments:
- $Al_2O_3$ may represent between 48 and 54 wt %;
- $TiO_2$ may represent between 35 and 48 wt %, for example between 38 and 45 wt %;
- $Fe_2O_3$ may represent between 1 and 8 wt %, for example between 2 and 6 wt %;
- $SiO_2$ is present in proportions of less than 1 wt %, or less than 0.5 wt % or even is not present in said phase; and
- $ZrO_2$ is less than 3 wt % or even is not present in said phase.

In the particle compositions given above, according to the other preferred embodiment of the invention, the $Fe_2O_3$ ($M_2$ is Fe) may be replaced with a combination of $Fe_2O_3$ and $La_2O_3$ ($M_2$ then being a combination of Fe and La), as described above.

Although its presence according to the invention is not necessary, the phase may also comprise the element Mg, it being possible for the corresponding oxide MgO to represent in this case between 0.5 and 8% of the weight of the phase, for example between 1 and 5 wt %. According to another possible embodiment, said phase does not contain the element Mg in a form other than inevitable impurities.

The particles according to the invention may furthermore comprise a silicate secondary phase in proportions that may range from 0 to 40% of the total weight of the particles, preferably from 0 to 30% and very preferably from 0 to 25% of the total weight of the particles, for example between 10 and 20% of the total weight of the particles. According to the invention, said silicate phase may be formed mainly from silica and alumina. Preferably, the proportion of silica in the silicate phase is greater than 34%, or greater than 40% or even greater than 50%.

The particles according to the invention may furthermore, or alternatively, comprise, depending on the elements $M_1$, $M_2$ or $M_3$ initially introduced before the fusing operation, at least one secondary and/or minor phase essentially comprising titanium oxide $TiO_2$ and/or zirconium oxide $ZrO_2$ and/or cerium oxide $CeO_2$ and/or hafnium oxide $HfO_2$. The term "essentially comprising" is understood to mean that the percentage by weight of $TiO_2$ and/or $ZrO_2$ and/or $CeO_2$ and/or $HfO_2$ in this phase is around at least 80%, or even at least 90%.

According to a second aspect, a subject of the invention is a ceramic product or material obtained by sintering the particles described above, said product or material comprising mainly or being formed by an oxide phase of the aluminum titanate type, essentially comprising aluminum, titanium, $M_2$ and optionally at least one of the elements $M_1$ and/or $M_3$, said product or material furthermore optionally comprising a silicate phase.

The invention thus relates to a ceramic material or product obtained by sintering and being characterized in that it comprises particles according to the invention, having the following chemical composition, in wt % on the basis of the oxides:
- more than 15% but less than 55% of $Al_2O_3$;
- more than 25% but less than 60% of $TiO_2$;
- less than 20%, in total, of at least one oxide of an element $M_1$, chosen from MgO and CoO;
- more than 0.7% but less than 20%, in total, of at least one oxide of an element $M_2$, chosen from the group formed by $Fe_2O_3$, $Cr_2O_3$, $MnO_2$, $La_2O_3$, $Y_2O_3$ and $Ga_2O_3$;
- less than 20%, in total, of at least one oxide of an element $M_3$, chosen from the group formed by $ZrO_2$, $Ce_2O_3$ and $HfO_2$; and
- less than 30% of $SiO_2$.

In general, all the embodiments described above in relation to the compositions of the fused particles can be directly transposed to the ceramic product (or material) according to the invention. Most particularly, all the preferred values and ranges described above in relation to the composition of the corresponding particles, especially all the values and ranges which relate, on the basis of the percentages by weight of the corresponding oxides, to the various elements liable to be in their composition, especially Al, Ti, $M_1$, $M_2$, $M_3$ and the elements Ca, Na, K, Sr and Ba, can be directly transposed to the composition of the product (or material) according to the invention.

Once again, in order for the present description not to be unnecessarily burdened, all the possible combinations according to the invention between the various preferred embodiments of the compositions of the products or materials according to the invention are not reported here. However, all possible combinations of the initial and/or preferred ranges and values described above with regard to the composition of the constituent particles of the material are of course envisaged for the composition of the material itself, obtained by sintering said fused particles.

Most particularly, the applicant has discovered very effective materials comprising a main oxide phase of the aluminum titanate type having the following composition, in wt % on the basis of the oxides:
- more than 45% but less than 55% of $Al_2O_3$;
- more than 30% but less than 50% of $TiO_2$;
- more than 1% but less than 10% of $Fe_2O_3$;
- less than 5% of $SiO_2$; and
- less than 5% of $ZrO_2$.

In particular, according to certain possible embodiments:
- $Al_2O_3$ may represent between 48 and 54 wt %;
- $TiO_2$ may represent between 35 and 48 wt %, for example between 38 and 45 wt %;
- $Fe_2O_3$ may represent between 1 and 8 wt %, for example between 2 and 6 wt %;
- $SiO_2$ is present in proportions of less than 1 wt %, or even less than 0.5 wt % or the phase is even devoid of Si; and
- $ZrO_2$ is less than 3 wt %, or the phase is even devoid of Zr.

Although its presence is not necessary according to the invention, the phase may also comprise the element Mg, it being possible for the corresponding oxide MgO in this case to represent between 0.5 and 8 wt % of the phase, for example between 1 and 5 wt %. According to another possible embodiment, said phase does not contain the element Mg in a form other than inevitable impurities.

Just as previously and for the sake of concision of the present application, it is understood that all the possible combinations according to the invention between the various initial or preferred embodiments of the compositions of the aluminum-titanate-type phases, as described above, are not reported here but must be considered as envisaged and described by the applicant within the context of the present description (especially two, three or more combinations).

For example, according to one possible embodiment of the invention, a conforming ceramic product has the following chemical composition, in wt % on the basis of the oxides:
- more than 35% but less than 51% of $Al_2O_3$, for example between 38 and 50% of $Al_2O_3$;
- more than 25% but less than 45% of $TiO_2$;
- more than more than 0.7% but less than 20% of $Fe_2O_3$, for example between 1 and 10% of $Fe_2O_3$;
- optionally, more than 0.1% but less than 20% of $SiO_2$;
- less than 2% of MgO, or even less than 1% of MgO;
- optionally, more than 0.3% but less than 10% of $ZrO_2$; and
- optionally, more than 2% but less than 13%, in total, of at least one oxide chosen from the group formed by CaO, $Na_2O$, $K_2O$, SrO and BaO.

The ceramic material or product according to the invention may for example comprise a main phase formed by the phase in solid solution comprising titanium, aluminum and oxides chosen from the oxides of $M_1$, $M_2$ or $M_3$ and at least one silicate phase and/or at least one phase essentially consisting of titanium oxide $TiO_2$ and/or zirconium oxide $ZrO_2$ and/or cerium oxide $CeO_2$ and/or hafnium oxide $HfO_2$.

Preferably, the ceramic material or product according to the invention may mainly comprise or be formed by an oxide phase in solid solution comprising titanium, aluminum, iron and optionally magnesium and/or zirconium and optionally at least one silicate phase and/or at least one phase essentially consisting of titanium oxide $TiO_2$ and/or zirconium oxide $ZrO_2$.

Said silicate phase may be present in proportions that may range from 0 to 45% of the total weight of the material. Typically, said silicate phase mainly consists of silica and alumina, the proportion by weight of silica in the silicate phase being greater than 34%.

Another secondary phase may essentially comprise titanium oxide $TiO_2$ and/or zirconium oxide $ZrO_2$ and/or cerium oxide $CeO_2$ and/or hafnium oxide $HfO_2$.

Advantageously, the particles of the invention may be produced by the electric fuse-cast process, which enables large quantities of particles to be manufactured with high yields and a very good price/performance ratio.

The invention also relates to the process for manufacturing the particles described above, which comprises the following steps:
a) the raw materials are blended to form the starting feedstock;
b) the starting feedstock is melted until the molten liquid is obtained;
c) said molten liquid is cooled so that it is entirely solidified, for example in less than 3 minutes; and
d) said solid mass is ground so as to obtain a blend of fused particles.

According to the invention, in step a) the raw materials are chosen so that the fused particles obtained in step d) are in accordance with the invention.

Of course, without departing from the scope of the invention, any other conventional or known process for manufacturing fused particles may also be employed, provided that the composition of the starting feedstock allows particles having a composition according to that of the particles of the invention to be obtained.

In step b), it is preferred to use an electric arc furnace, but all known furnaces may conceivably be used, such as an induction furnace or a plasma furnace, provided that they allow the starting feedstock to be completely melted. Preferably, the firing is carried out under inert conditions, for example in argon, or under oxidizing conditions, preferably at atmospheric pressure.

In step c), the cooling may be rapid, that is to say the molten liquid is entirely solidified in less than 3 minutes. Preferably, the cooling results from casting the liquid into CS molds as described in the U.S. Pat. No. 3,993,119 or from quenching.

In step d), the solid mass is ground, using conventional techniques, until the size of the particles suitable for the envisaged application is obtained. For example, the grinding may be continued until particles of micron size, for example of the size of 0.1 to 50 microns, are obtained.

According to one particular application, the product according to the present invention has a honeycomb structure made of a porous ceramic material, said structure consisting of a porous ceramic material obtained from the particles according to the invention, said structure furthermore having a porosity of greater than 10% and a pore size centered between 5 and 60 microns.

According to one particularly important aspect of the present invention, this relates to the use of the particles described above for the manufacture of particulate filters or catalyst supports used especially for automobile exhaust gas pollution control.

When the structures obtained according to the invention are intended for use as a particulate filter, they have a suitable porosity, in general between 20 and 65%, the mean pore size ideally being between 10 and 20 microns.

Such filter structures usually have a central portion comprising a honeycomb filtering element or a plurality of honeycomb filtering elements bonded together by a jointing cement, said element or elements comprising an assembly of adjacent ducts or channels of mutually parallel axes separated by porous walls, which ducts are closed off at one or other of their ends by plugs so as to define inlet chambers opening onto a gas entry face and outlet chambers opening onto a gas discharge face, in such a way that the gas passes through the porous walls.

One process for manufacturing such a structure from an initial blend of particles according to the invention is for example the following:

Firstly, the fused particles according to the invention are blended as described above. For example, the fused particles are ground in such a way that they have a median diameter of less than 50 microns, for example around 0.1 to 40 microns. The manufacturing process typically comprises a step of mixing an initial blend comprising the particles, an organic binder of the methyl cellulose type and a pore former, after which water is added until the desired plasticity for the following extrusion step is obtained.

For example, the first step involves mixing a blend comprising:
- at least 5%, for example at least 50%, or at least 90% or even 100% of particles according to the invention, the rest of the blend possibly consisting of a powder or particles of other materials or else simple oxides of the elements Al, Ti, $M_1$, $M_2$ or $M_3$ or precursors of said oxides, for example in the form of carbonates, hydroxides or other organometallics of the above elements;
- optionally, 1 to 30% by weight of at least one pore former chosen according to the desired pore size;
- at least one organic plasticizer and/or one organic binder; and
- a certain amount of water in order to allow the product to be formed.

The term "precursor" is understood to mean a material that decomposes into the corresponding simple oxide often at an early stage in the heat treatment, that is to say at a heating temperature typically below 1000° C., or below 800° C. or even below 500° C.

The mixing results in a homogeneous product in the form of a paste. The step of extruding this product through a suitable die allows honeycomb-shaped monoliths to be obtained. The process then comprises for example a step of drying the monoliths obtained. During the drying step, the green ceramic monoliths obtained are typically dried by microwave heating or dried at a temperature for a time long enough to bring the content of non-chemically bonded water down to less than 1% by weight. If it is desired to obtain a particulate filter, the process may furthermore include a step of plugging every other channel at each end of the monolith.

The monolith firing step is carried out at a temperature above 1300° C. but not exceeding 1800° C., preferably not exceeding 1750° C. For example, during this firing step, the monolith structure is heated to a temperature of between 1400° C. and 1600° C., in an atmosphere containing oxygen or an inert gas.

The process may optionally comprise a step of assembling the monoliths into an assembled filter structure according to well-known techniques, for example those described in patent application EP 816 065.

In one example of an application, the present invention relates to a filter or a catalyst support obtained from a structure as described above and by deposition, preferably by impregnation, of at least one supported, or preferably unsupported, active catalytic phase typically comprising at least one precious metal, such as Pt and/or Rh and/or Pd, and optionally an oxide such as $CeO_2$, $ZrO_2$ or $CeO_2$—$ZrO_2$. Such structures are especially applicable as a catalyst support in an exhaust line of a diesel or gasoline engine or as a particulate filter in an exhaust line of a diesel engine.

The invention and its advantages will be better understood on reading the following non-limiting examples. In the examples, all the percentages are given by weight.

EXAMPLES

In all the examples according to the invention, the specimens were prepared from the following raw materials:
  AR75 alumina comprising more than 98% $Al_2O_3$, solid by Alcan and having a median diameter $d_{50}$ of about 85 µm;
  anathase comprising more than 98% $TiO_2$, sold by Altichem or rutile comprising more than 95% $TiO_2$ and having a median diameter $d_{50}$ of about 120 µm, sold by Europe Minerals;
  $SiO_2$ having a purity greater than 99.5% and a median diameter $d_{50}$=208 µm, sold by Sifraco;
  MgO having a purity greater than 98% with more than 80% of the particles having a diameter between 0.25 and 1 mm, sold by Nedmag;
  $Fe_2O_3$ having a purity greater than 98%;
  lime comprising about 97% CaO with more than 80% of the particles having a diameter of less than 80 µm;
  strontium carbonate comprising more than 98.5% $SrCO_3$, sold by Société des Produits Chimiques Harbonnières;
  potassium carbonate comprising more than 99.5% $K_2CO_3$, sold by Albemarle with more than 80% of the particles having a diameter of between 0.25 and 1 mm;
  zirconia having a purity greater than 98.5% and a median diameter $d_{50}$=3.5 µm, sold under the reference CC10 by Saint-Gobain ZirPro; and
  lanthanum oxide $La_2O_3$ having a purity greater than 99%.

The specimens of the examples according to the invention were obtained by melting the blend of the above powders in the appropriate proportions given in Table 1.

More precisely, the initial blends of reactants were firstly melted in an electric arc furnace in air. The molten mixture was then cast in a CS mold so as to be rapidly cooled. The product obtained was ground and screened so as to retain 36 µm powder. This powder was used to produce pressed specimens 10 mm in diameter which were then sintered at the temperature indicated in Table 1 for four hours.

The prepared specimens were then analyzed. The results of the analyses carried out on each of the specimens of the examples are given in Tables 1 and 2.

In Tables 1 and 2:
  1) the chemical composition, indicated in wt % on the basis of the oxides, was determined by X-ray fluorescence;
  2) the crystalline phases present in the refractory products were characterized by X-ray diffraction. In Tables 1 and 2, ATX indicates a solid solution of oxides (main phase), PS indicates the presence of a silicate phase, one or more other phases indicate the presence of at least one other minor phase P2, while "~" means that the phase or phases are present in the form of traces;
  3) the stability of the crystalline phases present was evaluated by a test consisting in comparing by X-ray diffraction the crystalline phases initially present with those present after a heat treatment of 100 hours at 1100° C. The product was considered to be stable if the maximum intensity of the main peak indicating the appearance of corundum ($Al_2O_3$) after this treatment remains less than 50% of the average of the maximum intensities of the three main peaks of the ATX phase. The values given in Table 1 correspond to the ratio, as a percentage, of the maximum intensity of the main peak of the rutile phase to the average of the maximum intensities of the three main peaks of the ATX phase, according to the formula:

$$Al_2O_3 / Al_2TiO_5 = \frac{\text{maximum intensity of the peak of the main corundum peak}}{\text{average of the maximum intensities of the three large } Al_2TiO_5 \text{ peaks}}$$

It is considered that a ratio of less than 50 in the intensities, given as a percentage, and as described above, characterizes good stability of the material and allows it to be used at temperature; and
  4) the thermal expansion coefficient (TEC) corresponds to the average of the conventionally obtained values from 25° C. to 1000° C. by dilatometry on disks prepared from powders with the same particle size distribution, the median diameter $d_{50}$ of which is less than 50 µm. The disks were obtained by pressing followed by sintering at the temperature indicated in Table 1 for 4 h in air.

Comparative specimens, not according to the invention, were also synthesized and analyzed using the same methods as described above, with however the following modifications:
  according to comparative examples 1 and 4, the fused particles were synthesized without introducing a source of the metal $M_2$ (Fe) into the initial reactants;
  according to comparative example 3, the fused particles were synthesized by introducing an insufficient amount of the metal $M_2$ (Fe), within the context of the present invention, into the initial reactants; and according to comparative example 2, the specimen was not synthesized by sintering the fused particles, that is to say from particles obtained by a prior step of melting the blend of raw materials described above, but directly from reactive sintering of the powder blend of the following raw materials:

Almatis CL4400FG alumina comprising 99.8% $Al_2O_3$ and having a median diameter $d_{50}$ of about 5.2 μm;

TRONOX T-R titanium oxide comprising 99.5% $TiO_2$ and having a diameter of around 0.3 μm;

971U grade Elkem microsilicia $SiO_2$ having a purity of 99.7%;

strontium carbonate comprising more than 98.5% $SrCO_3$, sold by Société des Produits Chimiques Harbonnières;

lime comprising about 97% CaO, with more than 80% of the particles having a diameter of less than 80 μm; and $Fe_2O_3$ having a purity greater than 98%.

TABLE 1

| | Example | 1 | 2 | 2b | 3 | 4 | 5 | 6 | 7 |
|---|---|---|---|---|---|---|---|---|---|
| | $Al_2O_3$ | 43.6 | 40.7 | 40.7 | 44.0 | 45.6 | 46.7 | 33.9 | 45.3 |
| | $TiO_2$ | 28.0 | 39.1 | 39.1 | 37.4 | 42.5 | 40.4 | 33.7 | 31.3 |
| | $Fe_2O_3$ | 3.87 | 12.8 | 12.8 | 4.52 | 3.98 | 3.9 | 18.4 | 6.29 |
| | $SiO_2$ | 14.2 | 4.04 | 4.04 | 3.37 | 0.16 | 0.19 | 8.28 | 10.1 |
| | SrO | 8.70 | 2.39 | 2.39 | 0 | 0 | 0 | 4.65 | 5.51 |
| | CaO | 1.15 | 0.38 | 0.38 | 0.19 | 0.03 | 0.02 | 0.57 | 0.87 |
| | MgO | 0 | 0 | 0 | 1.67 | 0 | 0 | 0 | 0 |
| | $La_2O_3$ | 0 | 0 | 0 | 0 | 0 | 0 | 0 | 0.17 |
| | $Na_2O$ | 0.11 | 0.08 | 0.08 | 0.08 | 0.07 | 0.07 | 0.05 | 0.07 |
| | $K_2O$ | 0 | 0 | 0 | 0.34 | 0.08 | 0.07 | 0 | 0 |
| | $ZrO_2$ | 0.31 | 0.52 | 0.52 | 7.86 | 7.51 | 8.64 | 0.35 | 0.34 |
| | a | 37.3 | 37.3 | 37.3 | 39.0 | 41.8 | 43.0 | 31.2 | 39.8 |
| | a' | 29.6 | 34.9 | 34.9 | 36.9 | 41.7 | 42.9 | 26.4 | 34.2 |
| | t | 30.6 | 45.7 | 45.7 | 42.2 | 49.7 | 47.6 | 39.6 | 35.1 |
| | $m_1$ | 0 | 0 | 0 | 3.7 | 0 | 0 | 0 | 0 |
| | $m_2$ | 2.1 | 7.5 | 7.5 | 2.6 | 2.3 | 2.3 | 10.8 | 3.6 |
| | $a' - t + 2m_1 + m_2$ | 1.2 | −3.3 | −3.3 | 4.6 | −5.7 | −2.4 | −2.4 | 2.7 |
| Phases | PS | yes | yes | yes | yes | no | no | ND* | ND* |
| | Other phase(s) (P2) | ~ | ~ | ~ | yes | yes | yes | ND* | ND* |
| Stability | 100 hrs | yes | yes | yes | yes | yes | yes | yes | yes |
| | $Al_2O_3/Al_2TiO_5$ peak ratio | <10 | <10 | ND* | ND* | ND* | ND* | ND* | ND* |
| 4-hr. sintering temperature (° C.) | | 1450 | 1450 | 1400 | 1450 | 1600 | 1600 | 1400 | 1450 |
| Density | | 3.05 | 3.12 | 2.90 | 3.07 | 3.24 | 3.27 | 3.39 | 3.18 |
| Density as a percentage of the theoretical density | | 87.0 | 81.3 | 75.5 | ND* | 82.0 | 83.0 | 89.7 | 87.1 |
| TEC ($10^{-6}$/° C.) | | 2.5 | 1.8 | 2.1 | 1.9 | 2.9 | 3.3 | 3.0 | 1.7 |

| | Example | 8 | Comp. 1 | Comp. 2 | Comp. 3 | Comp. 4 | Comp. 5 |
|---|---|---|---|---|---|---|---|
| | $Al_2O_3$ | 39.5 | 45.7 | 43.6 | 53.6 | 53.1 | 54.6 |
| | $TiO_2$ | 30.7 | 28.1 | 28.0 | 38.3 | 45.6 | 33.4 |
| | $Fe_2O_3$ | 10.7 | 0.06 | 3.87 | 0.70 | 0.04 | 5.34 |
| | $SiO_2$ | 10.3 | 15.5 | 14.2 | 4.19 | 0.12 | 3.12 |
| | SrO | 5.73 | 9.34 | 8.70 | 2.20 | 0 | 0 |
| | CaO | 0.93 | 1.13 | 1.15 | 0.33 | 0.05 | 0.04 |
| | MgO | 0 | 0 | 0 | 0 | 0 | 1.37 |
| | $La_2O_3$ | 0.13 | 0 | 0 | 0 | 0 | 0 |
| | $Na_2O$ | 0.05 | 0.13 | 0.11 | 0.16 | 0.16 | 0.07 |
| | $K_2O$ | 0 | 0.09 | 0 | 0 | 0.10 | 0 |
| | $ZrO_2$ | 1.87 | 0 | 0.31 | 0.39 | 0 | 2.04 |
| | a | 35.3 | 38.3 | 37.3 | 47.3 | 47.4 | 49.1 |
| | a' | 29.5 | 30.1 | 29.6 | 44.9 | 47.4 | 47.3 |
| | t | 35.0 | 30.0 | 30.6 | 43.1 | 52.0 | 38.3 |
| | $m_1$ | 0 | 0 | 0 | 0 | 0 | 3.1 |
| | $m_2$ | 6.1 | 0.0 | 2.1 | 0.4 | 0 | 3.1 |
| | $a' - t + 2m_1 + m_2$ | 0.4 | 0.12 | 1.2 | 2.2 | −4.6 | 18.3 |
| Phases | PS | ND* | yes | yes | yes | no | ND* |
| | Other phase(s) (P2) | ND* | ~ | ~ | ~ | ~ | ND* |
| Stability | 100 hrs | yes | no | yes | no | no | no |
| | $Al_2O_3/Al_2TiO_5$ peak ratio | ND* | >500 | <10 | >500 | >500 | 50 |
| 4-hr. sintering temperature (° C.) | | 1450 | 1450 | 1450 | 1450 | 1400 | 1450 |
| Density | | 3.23 | 3.10 | 2.36 | 2.64 | 2.45 | ND* |
| Density as a percentage of the theoretical density | | 88.1 | 89.6 | 67.2 | 71.7 | 65.5 | ND* |
| TEC ($10^{-6}$/° C.) | | 2.0 | 2.3 | 2.5 | 2.4 | 3.2 | ND* |

ND* = Not determined.

The corrosion resistance properties of the materials were evaluated for example 1 according to the invention and comparative example 2, the material according to example 1 having been this time obtained with an initial amount of pore formers so as to obtain the same density for both specimens. More precisely, 0.2 grams of synthetic ash having the following composition by weight: 20.76% CaO; 10.45% ZnO; 4.02% MgO; 26.59% $SO_3$; 14.63% $P_2O_5$; 1.31% $Fe_2O_3$; 6.40% $Al_2O_3$; 0.52% $K_2O$; 8.41% $Na_2O$; and 6.92% $CaSO_4$, were uniformly deposited on the surface of the disk. The specimen thus covered was then heated at 1300° C. in air for 5 hours. After cooling, the specimen was cut radially and prepared for observation in an SEM (scanning electron microscope) section. In the SEM photographs, the corrosion-affected depth E of the specimen, starting from the initial surface of the disk, was then determined visually. The erosion-affected depth E was 580 microns in the case of the specimen according to the invention (example 1 with 25% pore formers) and 1060 microns in the case of the comparative specimen (comparative example 2).

Analysis of the data given in Table 1 shows the superiority of the products/materials obtained from the particles according to the invention:

for a similar composition and the same sintering temperature, it is observed that the material or product obtained from the fused particles according to the invention (example 1) has a thermal expansion coefficient substantially identical to that of the material obtained by conventional methods of the reactive sintering type, as illustrated by comparative example 2, comparison of the corroded thicknesses E between the specimen according to example 1 (according to the invention) and the specimen according to comparative example 2 indicating however a better corrosion resistance for the material according to the invention; and as regards the density, it may be seen that the densities obtained for materials according to the invention are high and more than 80% of the theoretical density of the crystalline material. Such a property may in particular prove to be decisive in applications that require above all a very high density of the material, for example in applications in which the product is in contact with a corrosive medium (for example of the slag or molten metal type); a lesser porosity enables the infiltration resistance to be improved. This may also be useful in applications that require above all a very high mechanical strength of the material, for example in the field of foundry filters.

Example 6 or example 2b, in comparison with example 2, show that it is possible to lower the sintering temperature while still maintaining very satisfactory properties. Comparing example 1 according to the invention with comparative example 1 also shows that temperature stability of the material can be achieved, in accordance with the invention, only if the proportion of the metal $M_2$ (Fe) in said material, and especially in the main phase of the aluminum titanate type, expressed on the basis of the percentage by weight of the corresponding oxide $Fe_2O_3$, is sufficient, especially greater than at least 0.7%. If this is not so, the material appears to be unstable. The materials according to comparative examples 3 and 4, the iron proportion of which is also insufficient in the context of the present invention, exhibits even strong temperature instability. The material according to comparative example 5 (not according to the invention), in that the parameter $a'-t+2 m_1+m_2$ is greater than 15, shows insufficient stability.

The composition of each phase was then analyzed by microprobe analysis, the results of the analysis being given in Table 2. Based on these results, the percentage by weight of each phase was able to be estimated by calculation.

TABLE 2

| | Example | | | | | | | | | |
|---|---|---|---|---|---|---|---|---|---|---|
| | 1 | | 4 | | | 5 | | | Comparative 1 | |
| | ATX | PS | ATX | P2a | P2b | ATX | P2a | P2b | ATX | PS |
| $Al_2O_3$ | 51.5 | 31.4 | 51.7 | 0.9 | 0.5 | 52.1 | 0.7 | 0.8 | 56.2 | 30.7 |
| $TiO_2$ | 42.1 | 1.47 | 41.9 | 37.8 | 84.5 | 41.6 | 11.6 | 33.6 | 42.6 | 3.7 |
| $Fe_2O_3$ | 4.97 | 0.63 | 4.4 | 0.6 | 0.8 | 3.9 | 0.5 | 0.6 | 0.1 | 0 |
| $SiO_2$ | 0.3 | 40.37 | 0 | 0 | 0 | 0 | 0 | 0 | 0.33 | 38.9 |
| SrO | 0 | 24.8 | 0 | 0 | 0 | 0 | 0 | 0 | 0 | 23.97 |
| CaO | 0 | 3.1 | 0 | 0 | 0 | 0 | 0 | 0 | 0 | 2.7 |
| MgO | 0 | 0 | 0 | 0 | 0 | 0 | 0 | 0 | 0 | 0 |
| $Na_2O$ | 0 | 0.3 | 0 | 0 | 0 | 0 | 0 | 0 | 0 | 0.33 |
| $K_2O$ | 0 | 0 | 0 | 0 | 0 | 0 | 0 | 0 | 0 | 0 |
| $ZrO_2$ | 0.43 | 0.07 | 1.9 | 60.7 | 14.2 | 2.3 | 87.2 | 65.0 | 0.33 | 0.47 |
| Estimated percentage | 65 | 35 | 88 | 9 | 3 | 90 | 1 | 9 | 61 | 39 |

The results given in Table 2 show that the materials of the examples according to the invention are formed by a main oxide phase in solid solution, comprising titanium, aluminum and iron, in very similar proportions and optionally magnesium and/or zirconium in very minor proportions. The materials also comprise a secondary phase which may be a silicate phase and/or at least one phase essentially consisting of titanium oxide $TiO_2$ and zirconium oxide $ZrO_2$, depending on the nature of the reactants initially used.

The purpose of a second series of experiments was to show the advantages of the materials obtained from the fused particles according to the invention in terms of mechanical resistance and density.

Two additional specimens were prepared:
  a first specimen according to the invention, obtained from particles fused beforehand, obtained as described above. The chemical composition of this first specimen, as analyzed by X-ray fluorescence, was, as an equivalent wt % of the corresponding simple oxides:
  45.5% $Al_2O_3$; 34.3% $TiO_2$; 6.37% $Fe_2O_3$; 7.41% $SiO_2$; 5.17% SrO; 0.6% CaO; 0.13% $Na_2O$; 0.39% $ZrO_2$.
  The $a'-t+2 m_1+m_2$ parameter according to the invention was 1.0;
  a second specimen, not according to the invention, was then prepared using the same oxide composition as the first but this time by blending and direct reactive sintering of the raw materials, according to a method of preparation similar to that described above in comparative example 2.

For both specimens, the compressive strength MoR was measured at room temperature using a LLOYD machine equipped with a 10 kN sensor, by compressing disks measuring 10 mm in diameter and 12 mm in height at a speed of 1 mm/min, the disks having been prepared from powders of the same particle size distribution, the median diameter $d_{50}$ of which was less than 50 μm. The disks were obtained by pressing and then sintering the particles at a temperature of 1450° C. for 4 h in air.

The measured MoR values were 230 MPa for the first specimen obtained from the fused particles according to the invention, but only 24 MPa for the comparative specimen, obtained by reactive sintering of the raw materials. For a similar composition, it may thus be seen that the materials according to the invention have a significantly higher strength MoR.

Likewise, the density measured for the first specimen was 3.14 (85% of the theoretical density of the crystalline material), whereas this density was only 2.31 for the second specimen (i.e. 63% of the theoretical density of the crystalline material).

The densities obtained for materials according to the invention are therefore substantially higher than those obtained by the conventional reactive sintering techniques.

Such an improvement may in particular prove to be decisive in applications that require most particularly a very high density of the material, for example in applications in which the product is in contact with a corrosive medium (for example of the slag or molten metal type); a lesser porosity makes it possible to improve the infiltration resistance. This may also be useful in applications that require most particularly a very high mechanical strength of the material, for example in the field of foundry filters.

Such an improvement may also make it possible to adjust a high level of porosity (in particular by introduction of a pore former into the initial reactants) while still maintaining good mechanical integrity.

In the examples and the description above, the invention has most particularly been described in relation to the advantages that it provides for use in the field of particulate filters.

However, it is obvious that the invention also relates to the use of the particles of the invention in other applications, in particular all those in which good thermal stability and a good TEC are necessary. Depending on the application, it may in particular be possible to adapt the size of the fused particles according to the invention, in particular by choosing a suitable grinding method.

The invention claimed is:

1. A fused particle, comprising:
   more than 15% and less than 55% of $Al_2O_3$;
   more than 25% and less than 60% of $TiO_2$;
   less than 20%, in total, of at least one oxide of an element $M_1$ selected from the group consisting of MgO and CoO;
   more than 0.7% and less than 20%, in total, of at least one oxide of an element $M_2$, selected from the group consisting of $Fe_2O_3$, $Cr_2O_3$, $MnO_2$, $La_2O_3$, $Y_2O_3$, and $Ga_2O_3$;
   less than 20%, in total, of at least one oxide of an element $M_3$, selected from the group consisting of $ZrO_2$, $Ce_2O_3$, and $HfO_2$; and
   less than 30% of $SiO_2$,
   wherein percentages are by weight, based on oxide content,
   a composition of the particle, in mol % on the basis of oxide in the particle, satisfies an expression $a'-t+2m_1+m_2$ of a value from −15 to 15,
   a is a molar percentage of $Al_2O_3$,
   s is a molar percentage of $SiO_2$,
   a'=a−0.37 s,
   t is a molar percentage of $TiO_2$,
   $m_1$ is a total molar percentage of the at least one oxide of $M_1$, and
   $m_2$ is a total molar percentage of the at least one oxide of $M_2$,
   wherein the fused particle is obtained by melting the $Al_2O_3$, the $TiO_2$, the at least one oxide of element $M_1$, the at least one oxide of element $M_2$, the at least one oxide of element $M_3$, and the $SiO_2$ to a molten liquid, cooling the molten liquid into a solid mass, and grinding the solid mass to produce the fused particle.

2. The fused particle of claim 1, wherein the composition satisfies the expression $a'-t+2m_1+m_2$ of a value from −10 to 10.

3. The fused particle of claim 1, wherein $Al_2O_3$ is more than 25% by weight of the composition and less than 52% of the composition.

4. The fused particle of claim 1, wherein $TiO_2$ is more than 26% by weight of the composition and less than 55% of the composition.

5. The fused particle of claim 1, wherein the at least one oxide of $M_1$ is in total more than 0.7% by weight of the composition and less than 10% of the composition.

6. The fused of claim 1, wherein the at least one oxide of $M_2$ is in total more than 1% by mass of the composition and less than 10% of the composition.

7. The fused particle of claim 1, wherein the at least one oxide of $M_3$ is in total more than 0.7% of the composition and less than 10% of the composition.

8. The fused particle of claim 1, further comprising silicon in a content of from 0.1 to 20% by weight on the basis of $SiO_2$.

9. The fused particle of claim 1, wherein the at least one oxide of $M_1$ consists of at least one magnesium oxide.

10. The particle of claim 1, wherein the at least one oxide of $M_2$ consists of at least one iron oxide.

11. The fused particle of claim 1, wherein the at least one oxide of $M_2$ comprises at least one iron oxide, at least one lanthanum oxide, or both.

12. The fused particle of claim 1, wherein the at least one oxide of $M_3$ consists of at least one zirconium oxide.

13. The fused particle of claim 1, comprising an aluminum titanate main oxide phase, comprising:
   more than 45% and less than 55% of $Al_2O_3$;
   more than 30% and less than 50% of $TiO_2$;
   more than 1% and less than 10% of $Fe_2O_3$;
   less than 5% of $SiO_2$; and
   less than 5% of $ZrO_2$,
   wherein percentages are by weight, based on oxide content.

14. A ceramic product or material, comprising:
   an aluminum titanate oxide phase, comprising aluminum, titanium, $M_2$, and optionally $M_1$, $M_3$, or both,
   wherein the product or material is obtained by a process comprising sintering the fused particle of claim 1.

15. The ceramic product or material of claim 14, comprising:
   more than 15% and less than 55% of $Al_2O_3$;
   more than 25% and less than 60% of $TiO_2$;
   less than 20%, in total, of at least one oxide of an element $M_1$, chosen from MgO and CoO;

more than 0.7% and less than 20%, in total, of at least one oxide of an element $M_2$, chosen from the group formed by $Fe_2O_3$, $Cr_2O_3$, $MnO_2$, $La_2O_3$, $Y_2O_3$ and $Ga_2O_3$;

less than 20%, in total, of at least one oxide of an element $M_3$, chosen from the group formed by $ZrO_2$, $Ce_2O_3$ and $HfO_2$; and less than 30% of $SiO_2$, wherein percentages are by weight, based on oxide content.

16. The ceramic product or material of claim 14, comprising an aluminum titanate main oxide phase comprising:

more than 45% and less than 55% of $Al_2O_3$;
more than 30% and less than 50% of $TiO_2$;
more than 1% and less than 10% of $Fe_2O_3$;
less than 5% of $SiO_2$; and
less than 5% of $ZrO_2$, wherein percentages are by weight, based on oxide content.

17. A catalyst support or particulate filter, comprising:

a ceramic material obtained by a process comprising sintering the particle of claim 1, wherein the catalyst support or particulate filter has a honeycomb structure.

18. The fused particle of claim 2, wherein the composition satisfies the expression $a'-t+2 m_1+m_2$ of a value from −8 to 8.

19. The fused particle of claim 18, wherein the composition satisfies the expression $a'-t+2 m_1+m_2$ of a value from −6 to 6.

20. The ceramic product or material of claim 14, comprising an aluminum titanate oxide phase, consisting of:

aluminum, titanium, $M_2$, and optionally $M_1$, $M_3$, or both.

* * * * *